(12) United States Patent
Shriver et al.

(10) Patent No.: US 11,007,465 B2
(45) Date of Patent: May 18, 2021

(54) ROTATING SUCTION WAND FOR A NON-CIRCULAR AIR SCREEN

(71) Applicant: CNH Industrial America LLC, New Holland, PA (US)

(72) Inventors: Joe E. Shriver, New Holland, PA (US); Joshua D. Werning, Mount Wolf, PA (US)

(73) Assignee: CNH Industrial America LLC, New Holland, PA (US)

( * ) Notice: Subject to any disclaimer, the term of this patent is extended or adjusted under 35 U.S.C. 154(b) by 376 days.

(21) Appl. No.: 16/185,797

(22) Filed: Nov. 9, 2018

(65) Prior Publication Data
US 2020/0147536 A1 May 14, 2020

(51) Int. Cl.
*B01D 46/00* (2006.01)
*F02M 35/02* (2006.01)
(Continued)

(52) U.S. Cl.
CPC ......... *B01D 46/0064* (2013.01); *A01D 41/06* (2013.01); *A01D 41/1252* (2013.01); *A01D 75/18* (2013.01); *A01D 75/187* (2013.01); *B01D 46/0002* (2013.01); *B01D 46/10* (2013.01); *B08B 5/04* (2013.01); *F02M 35/0201* (2013.01);
(Continued)

(58) Field of Classification Search
CPC .... A01D 41/06; A01D 41/12; A01D 41/1252; A01D 69/005; A01D 75/08; A01D 75/187; B01D 46/0002; B01D 46/0064; B01D 46/0065; B01D 46/10; B01D 2279/60;
(Continued)

(56) References Cited

U.S. PATENT DOCUMENTS 1,457,794 A * 6/1923 Piper ..................... B01D 21/18
210/529
3,183,647 A 5/1965 Lang et al.
(Continued)

FOREIGN PATENT DOCUMENTS

WO    2005/124017 A1    12/2005

OTHER PUBLICATIONS

Extended European Search Report for EP Application 19208030.7 dated Apr. 6, 2020 (four pages).

*Primary Examiner* — Jonathan Miller
*Assistant Examiner* — Gabriel E Gitman
(74) *Attorney, Agent, or Firm* — Peter Zacharias; Patrick Sheldrake (57) ABSTRACT

An agricultural equipment air screen cleaning assembly having a frame having an airflow opening having a non-circular outer perimeter, a screen mounted to the frame within the airflow opening and extending to the non-circular outer perimeter, a motor, and a suction wand operatively connected to the motor and located on an upstream side of the screen. The suction wand is rotatably connected about a rotation axis at a central region of the screen, and includes: at least one distal end that is movable in a radial direction with respect to the rotation axis to follow the non-circular outer perimeter as the suction wand rotates about the rotation axis, one or more inlet openings facing the screen, and an internal suction flow path in fluid connection with the one or more inlet openings, the suction flow path extending from a manifold to the distal end of the suction wand.

20 Claims, 7 Drawing Sheets

(51) Int. Cl.
*A01D 41/12* (2006.01)
*B01D 46/10* (2006.01)
*B08B 5/04* (2006.01)
*F02M 35/024* (2006.01)
*F02M 35/08* (2006.01)
*A01D 75/18* (2006.01)
*A01D 41/06* (2006.01)
*A01D 69/00* (2006.01)
*F01P 11/12* (2006.01)

(52) U.S. Cl.
CPC ...... *F02M 35/02491* (2013.01); *F02M 35/08* (2013.01); *A01D 41/12* (2013.01); *A01D 69/005* (2013.01); *B01D 2279/60* (2013.01); *F01P 11/12* (2013.01)

(58) Field of Classification Search
CPC ........ B08B 5/04; F01P 11/12; F02M 35/0201; F02M 35/02491; F02M 35/08
See application file for complete search history.

(56) References Cited

U.S. PATENT DOCUMENTS

| | | |
|---|---|---|
| 3,339,348 A | 9/1967 | Bratton et al. |
| 3,487,623 A | 1/1970 | Easter |
| 4,043,920 A * | 8/1977 | Wooh ................. B01D 21/2433 210/525 |
| 4,323,456 A * | 4/1982 | Olear .................... B01D 21/06 210/529 |
| 4,439,218 A | 3/1984 | Priepke et al. |
| 4,815,159 A | 3/1989 | Kohbach |
| 5,217,512 A | 6/1993 | Williams |
| 5,301,383 A | 4/1994 | Suzuki |
| 7,418,997 B2 | 9/2008 | Martin et al. |
| 8,974,564 B2 | 3/2015 | Hershbarger et al. |
| 9,943,164 B2 | 4/2018 | Kang et al. |
| 2009/0211208 A1 | 8/2009 | Johnson et al. |
| 2013/0014341 A1* | 1/2013 | Hershbarger .......... A01D 41/12 15/339 |

* cited by examiner

ROTATING SUCTION WAND FOR A NON-CIRCULAR AIR SCREEN

BACKGROUND OF THE INVENTION

Agricultural combines and other harvesting equipment typically are powered by an engine that requires airflow around the engine and/or a heat exchanger or radiator to maintain the engine at a suitable operating temperature. One or more air screens may be provided in airflow to filter debris (e.g., dust, chaff, etc.) from the air before they reach the engine and/or heat exchanger. In some operating environments, the screen may become clogged with a sufficient volume of debris to materially impede the airflow and the cooling of the engine.

Historically, various efforts have been made to address such clogging. In some cases, the screen has been formed as a circular screen that rotates within a circular opening, and a brush or vacuum wand is provided adjacent the intake side of the screen to remove debris from the screen as the screen is rotated by a motor. In other cases, a stationary air screen has been provided with a rotating brush or suction wand that rotates and removes debris caught by the screen.

As engines on agricultural equipment have become larger and have adopted more emission controls, the cooling air volume requirement has increased. In some cases, a round screen might not provide a sufficient amount of airflow for these increased need. Furthermore, simply increasing the diameter of the screen might not be possible due to countervailing machine height and shipping requirements.

Thus, in some cases the round screen has been replaced by a square screen, or additional cooling openings and their own respective screens are provided around the round screen. Such non-circular openings cannot be fully cleaned by rotating the screen, or providing a rotating screen cleaning wand. This has led to certain efforts to improve the cleaning of non-circular screens. For example, U.S. Pat. No. 8,974,564 shows a rotating suction wand having a small accessory brush that extends into the corners of a square screen as the wand rotates. However, suction is not applied at the location swept by the accessory brush, which reduces the cleaning efficiency in the corners. As another example, U.S. Pat. No. 9,943,164 shows a rectangular screen that is cleaned by a brushbar that extends across the screen and reciprocates back and forth across the screen. This device is relatively complex, heavy, and expensive to implement. As still another example, U.S. Pat. No. 7,418,997 shows a square screen having two wipers at respective opposite corners of the screen, which operate sequentially to sweep the entire screen area. This device is also relatively complex, and provides unnecessarily redundant cleaning.

This description of the background is provided to assist with an understanding of the following explanations of exemplary embodiments, and is not an admission that any or all of this background information is necessarily prior art.

SUMMARY OF THE INVENTION

In one exemplary embodiment, there is provided an agricultural equipment air screen cleaning assembly having a frame having an airflow opening having a non-circular outer perimeter, a screen mounted to the frame within the airflow opening and extending to the non-circular outer perimeter of the airflow opening, a motor, and a suction wand operatively connected to the motor and located on an upstream side of the screen. The suction wand is rotatably connected about a rotation axis at a central region of the screen. The suction wand has at least one distal end that is movable in a radial direction with respect to the rotation axis to follow the non-circular outer perimeter as the suction wand rotates about the rotation axis, one or more inlet openings facing the screen, and an internal suction flow path in fluid connection with the one or more inlet openings, the suction flow path extending from a manifold to the at least one distal end of the suction wand.

In another exemplary embodiment, there is provided an agricultural combine having an engine, a frame having an airflow opening having a non-circular outer perimeter, a screen mounted to the frame within the airflow opening and extending to the non-circular outer perimeter, an airflow passage extending from the screen to the engine, and an air screen cleaning assembly. The Air screen cleaning assembly includes: a motor and a suction wand operatively connected to the motor and located on an upstream side of the screen. The suction wand is rotatably connected about a rotation axis at a central region of the screen, and includes at least one distal end that is movable in a radial direction with respect to the rotation axis to follow the non-circular outer perimeter as the suction wand rotates about the rotation axis, one or more inlet openings facing the screen, and an internal suction flow path in fluid connection with the one or more inlet openings, the suction flow path extending from a manifold to the at least one distal end of the suction wand.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide mechanisms for cleaning air screens of agricultural equipment. Embodiments may be used in any type of agricultural equipment, such as combines, harvesters, balers, plows, tractors, and so on. Embodiments also have application in other powered equipment, such as construction vehicles, generators, and so on, that might require a system to periodically or continuously automatically clean an engine air screen.

A first exemplary embodiment of the invention is shown as an air screen cleaning assembly 100 in FIGS. 1A through 2B. The assembly 100 generally includes a frame 102, a screen 104 mounted to the frame 102, a motor 106, and a suction wand 108.

The frame 102 is a generally rigid structure that is configured to be attached to or formed as part of an agricultural machine or other piece of equipment. For example, the frame 102 may comprise a structure formed by a stamped panel of sheet metal, welded metal beams, molded plastic, fiberglass mounted to a rigid subframe, or the like. The frame 102 has an airflow opening through which airflow can pass to cool an engine and/or to provide engine air intake. Such airflow may pass directly over the engine, or over a part of an engine cooling system, such as a radiator, or into an engine air intake system.

Figures 1A, 2A, 2B:
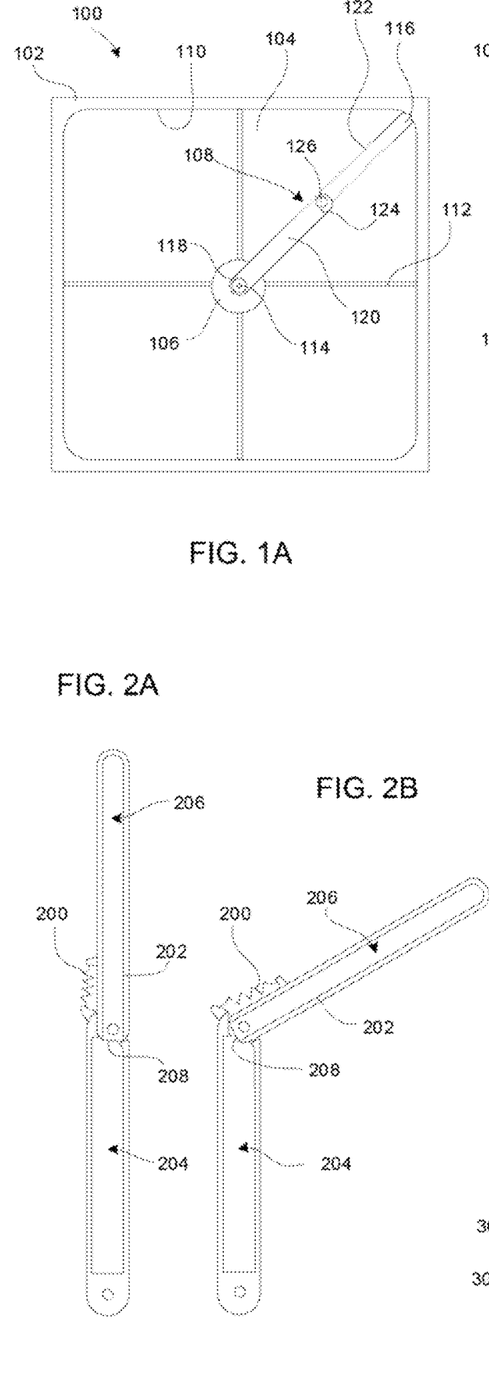
FIGS. 1A and 1B are plan views, as viewed from an upstream direction, of a first exemplary embodiment of an air screen cleaning assembly shown in two different operative positions.
FIGS. 2A and 2B are plan views, as viewed from a downstream direction, of the suction wand component of the embodiment of FIGS. 1A and 1B.
Figures 1B, 3A, 3B:
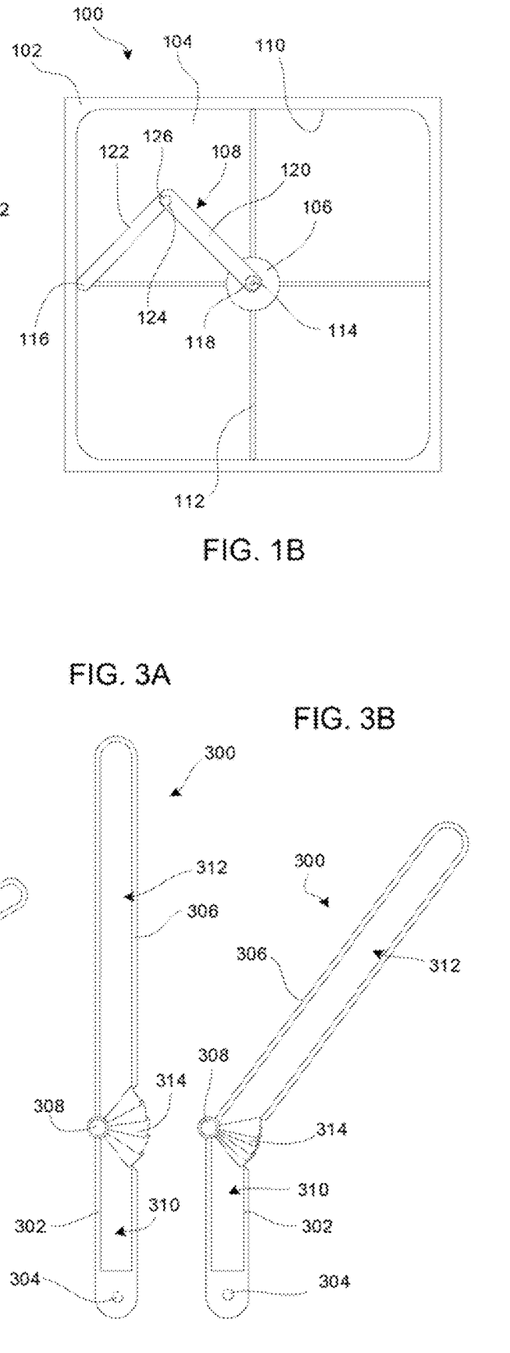
FIGS. 3A and 3B are plan views, as viewed from a downstream direction, of an alternative exemplary embodiment of a suction wand component.

The airflow opening has a non-circular outer perimeter 110. For example, the outer perimeter 110 can be a square shape having four equal-length straight sides that are connected at right angles to each adjacent side, such as shown in FIGS. 1A and 1B. The corners joining each side of the square may be rounded, such as shown in FIGS. 1A and 1B, or the edges may meet at right angles or other shapes. As used herein, "square" is intended to cover any shape having four straight sides, regardless of whether they are joined by beveled, rounded or square corners. In other cases, the outer perimeter 110 may be rectangular, or have other non-circular shapes. The outer perimeter 110 portion of the frame 102 may include an elastomeric or rubber seal or grommet or other structure to help seal and secure the screen 104 to the frame 102.

The outer perimeter 110 lies in a flat plane, and the airflow opening is covered by the screen 104, which extends to the outer perimeter 110 of the frame 102. Thus, the screen 104 effectively covers the airflow opening to prevent particles of a certain size from passing therethrough. The screen 104 may terminate at the outer perimeter 110, or it may extend under, over or within the frame 102. For example, an outer edge of the screen 104 may be welded or attached by fasteners to a side of the frame 102 that lies downstream of the expected airflow, or the screen 104 may be embedded into a flexible grommet that forms the outer perimeter 110 of the frame 102. Other alternatives and variations will be apparent to persons of ordinary skill in the art in view of the present disclosure.

The screen 104 may comprise any suitable structure for blocking particles or debris of a desired size. As used herein, the term "screen" includes any airflow-filtering device, such as wire meshes, perforated panels, porous filters (e.g., pleated or flat paper or polymeric sheets), and so on. For example, the screen 104 may comprise a wire mesh that is welded or screwed to the frame 102. As another example, the screen 104 may comprise a pleated porous sheet of paper or non-woven material that is retained in a paper or plastic filter frame. The screen 104 also may comprise be a combination of structures, such as a multiple wire mesh screens overlaying one another.

The motor 106 is operatively associated with the frame 102 and screen 104 and configured to rotate the suction wand 108 through a 360-degree range of motion. The motor 106 may be structurally and operatively mounted to the remainder of the assembly 100, or it may be structurally mounted to the underlying equipment and operatively connected to the suction wand 108 by one or more power transmission devices (belts, chains, gears, hydraulic circuits, etc.). In FIGS. 1A and 1B, the motor 106 is mounted to the frame 102 by support arms 112, and the output shaft of the motor 106 is coaxial with the rotation axis 114 of the suction wand 108. The output shaft may directly drive the suction wand 108, or drive it via one or more gears or the like (e.g., a planetary gear set). A clutch (not shown) may be provided to selectively engage and disengage the motor 106 from driving arrangement with the suction wand 108. The motor 106 also may include a selective drive control circuit to operate the motor 106 only at desired times. Any suitable motor may be used, such as a hydraulically-driven motor, an AC or DC electric motor, a mechanically-driven motor (e.g., operated off the engine drive), and so on.

The suction wand 108 is operatively connected to the motor 106 and is located on the upstream side of the screen 104, and rotatable about the rotation axis 114. The rotation axis 114 is positioned at the central region of the screen 104, and may be located at the geometric center of the shape defined by the outer perimeter 110. However, it will be appreciated from the discussion herein that the exact position of the rotation axis 114 can vary, so long as it remains within a central region of the screen 104 where it can rotate through a full 360 degrees and extend and contract to clean into the corners of the screen 104.

The suction wand 108 is configured to follow along the non-circular outer perimeter 110 of the airflow opening, so as to clean essentially the entire screen 104. To this end, the suction wand 108 has a distal end 116 that is movable in a radial direction with respect to the rotation axis 114 (FIGS. 1A and 1B show the rotation axis 114 being orthogonal to the screen 104, which lies flat in the plane of the illustrations). As such, the distal end 116 can extend outward to reach into the corners of the screen 104 (FIG. 1A), and contract inward to clean along the sides of the screen (FIG. 1B). Exemplary mechanisms for providing a radially-movable suction wand 108 are described in this and the following embodiments.

The suction wand 108 also includes one or more inlet openings that face the screen 104. The inlet openings are fluidly connected to an internal suction path that extends along the length of the suction wand 108. The suction path extends from the distal end 116 of the suction wand 108 to a manifold 118. The manifold 118 comprises one or more chambers configured to connect to a suction source, such as a vacuum fan or the like. The manifold 118 preferably is located at the rotation axis 114, to allow the suction path to connect to the suction source by a rotating slip-fit suction fitting, such as known in the art. However, the manifold 118 may be located elsewhere and connected via a flexible hose or the like to the suction source. Other alternatives and variations will be apparent to persons of ordinary skill in the art in view of the present disclosure.

In the embodiment of FIGS. 1A through 2B, the suction wand 108 has a first wand element 120 that extends from the rotation axis 114, and a second wand element 122 that extends from the first wand element 120 to the distal end 116 of the suction wand 108. The second wand element 122 is connected to the first wand element 120 by a pivot 124, having a pivot axis 126 that extends parallel to the rotation axis 114. The pivot 124 may comprise a single-shear pin joint, a clevis attachment, or any other suitable pivoting connection.

The first wand element 120 is operated by the motor 106 to rotate about the rotation axis 114, while the second wand element 122 rotates about the first wand element 120 about the pivot axis 126. The suction wand 108 is movable between a first position in which the distal end 116 of the suction wand 108 is located relatively far from the rotation axis 114, and a second position in which the distal end 116 of the suction wand 108 is located relatively close to the rotation axis 114. In the first position, which is shown in FIG. 1A, the distal end 116 reaches radially outward to extend into the corners of the non-circular outer perimeter 110. In the second position, which is shown in FIG. 1B, the distal end 116 retracts to clean along the walls of the non-circular outer perimeter 110 that are closest to the rotation axis 114. As the suction wand 108 rotates about the rotation axis 114, the distal end 116 can move between the first and second positions to follow along the outer perimeter 110. Any suitable mechanism may be used to hold the distal end 116 adjacent the outer perimeter 110 as the suction wand 108 rotates.

Referring to FIGS. 2A and 2B, the suction wand 108 is shown as viewed from the downstream side (as opposed to FIGS. 1A and 1B, which show the assembly 100 from the upstream side). In this exemplary embodiment, the suction wand 108 includes a spring 200 that connects the first wand element 120 to the second wand element 122. When the suction wand 108 is in the first position (FIG. 2A), the spring 200 is in a contracted state. When the suction wand is in the second position (FIG. 2B), the spring 200 is extended. Thus, the spring 200 must be extended to move the suction wand 108 from the first position to the second position, and, in doing so, the spring 200 generates an internal restoring force that tends to return the suction wand 108 to the first position.

In operation, the motor 106 rotates the first wand element 120 about the rotation axis 114 in a clockwise manner as viewed in FIGS. 1A and 1B, and counterclockwise as viewed in FIGS. 2A and 2B. When the first wand element is directed towards the far corners of the non-circular outer perimeter 110, the spring 200 contracts to move the second wand element 122 to the first position. As the first wand element 120 moves away from the corners, the second wand element contacts the outer perimeter 110 and this contact forces the second wand element 122 to assume a greater trailing angle relative to the first wand element 120. Such movement extends the spring 200, thus generating a restoring force to move the second wand element 122 back outwards as the first wand element 120 approaches the next corner. During such rotation, tea suction source connected to the manifold 118 generates a negative pressure within the suction path, which pulls air and debris into the suction wand 108 and thereby cleans the screen 104. Suction may be maintained continuously throughout rotation of the suction wand 108 by providing a rotating sealed joint at the manifold 118, such as known in the art.

In this example, the second wand element 122 trails behind the first wand element 120. However, in the first position, the second wand element 122 may be parallel with the first wand element 120, or angled to trail behind the first wand element. It will be understood that the spring 200 is shown as a coil spring that is operated in tension, but any other type of spring or spring operation may be used. For example, the spring 200 may be replace by a torsion spring that operates in compression to bias the suction wand 108 into the first position.

It is also envisioned that the second wand element 122 can be configured to lead the first wand element 120. For example, the spring 200 can be configured to retract the second wand element towards the second position when the spring 200 is in a resting state, thereby requiring an external force to move the suction wand 108 from the second position to the first position. In this case, the distal end 116 can be mounted to a track that is located outside the outer perimeter 110, such that the track prevents the distal end 116 from retracting away from the outer perimeter 110. As the first wand element 120 rotates, the second wand element 122 leads the first wand element. In the corners, the spring 200 extends to generate a restoring force that pulls the suction wand 108 from the first position to the second position.

Similarly, in either of the foregoing embodiments (leading or trailing) the distal end 116 may be configured to ride in a track at the outer perimeter 110 that positively locates the distal end 116 at each rotational position of the suction wand 108 (i.e., the track holds the distal both inwardly or outwardly). Other alternatives and variations will be apparent to persons of ordinary skill in the art in view of the present disclosure.

As shown in FIGS. 2A and 2B, the first wand element 120 and the second wand element 122 may collectively form a single inlet opening 202 facing the screen 104. In this case, the inlet opening 202 is formed by an open downstream side of each wand element 120, 122. For example, each wand element 120, 122 may comprise a C-shaped channel with the ends of the "C" pointing towards the screen 104. A first portion 204 of the internal suction flow path extends along the first wand element 120, and a second portion 206 of the internal suction flow path extends along the second wand element 122. The first portion 204 and the second portion 206 are in fluid communication via an open proximal end 208 of the second wand element 122. In this embodiment, the pivot connection between the first wand element 120 and the second wand element 122 does not interrupt the continuous inlet opening formed by the downstream sides of the first wand element 120 and the second wand element 122, or the continuous fluid communication path of the suction flow path. This configuration is expected to provide efficient cleaning of the screen 104, because there are no points along the suction flow path at which the inlet opening does not face the screen 104.

FIGS. 3A and 3B show an alternative embodiment of pivoting suction wand 300 having a pivoting connection and a continuous inlet and suction path. In this case, the suction wand 300 again comprises a first wand element 302 that is driven by a motor to rotate about a rotation axis 304, and a second wand element 306 that is pivotally connected to the first wand element 302 at a pivot 308 that has a pivot axis that is parallel to the rotation axis. The first and second wand elements 302, 306 each comprise a respective open channel that faces towards the downstream direction to form a respective first inlet portion 310 and a respective second inlet portion 312. The first and second inlet portions 310, 312 are connected by a flexible joint 314 that also opens in the downstream direction. The joint 314 is formed as multiple overlapping fan-shaped plates that can extend and collapse onto one another, thus forming a fluid communication path between the first wand element 302 and the second wand element 306. Alternatively, the plates may be replaced by a bellows or other structure that is open on the downstream side to form a continuous inlet along the length of the suction wand 300, but provides a sealed wall along the remaining sides of the suction wand 300.

Figure 4:
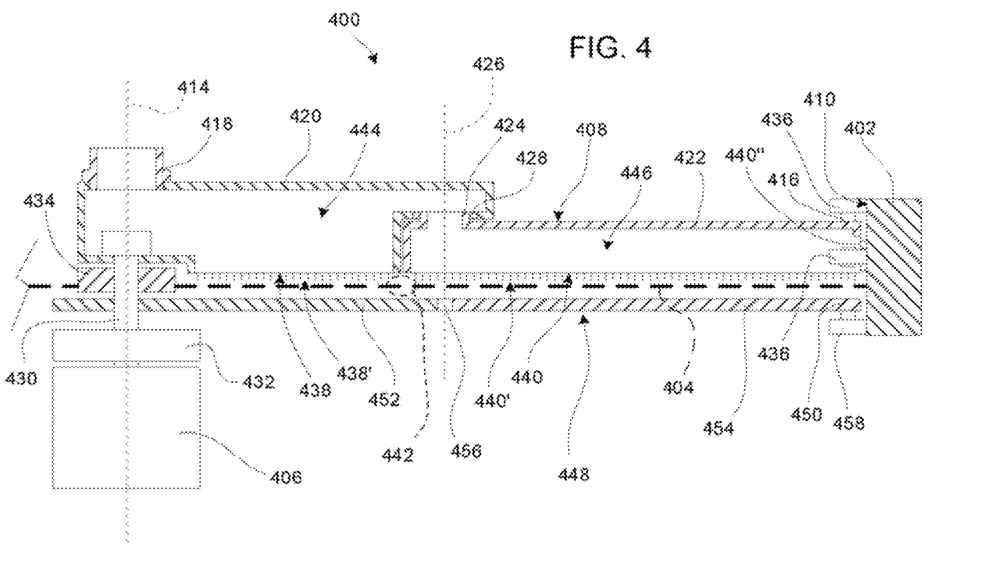
FIG. 4 is a cutaway side view of an other exemplary embodiment of an air screen cleaning assembly.
Figures 5A, 5B:
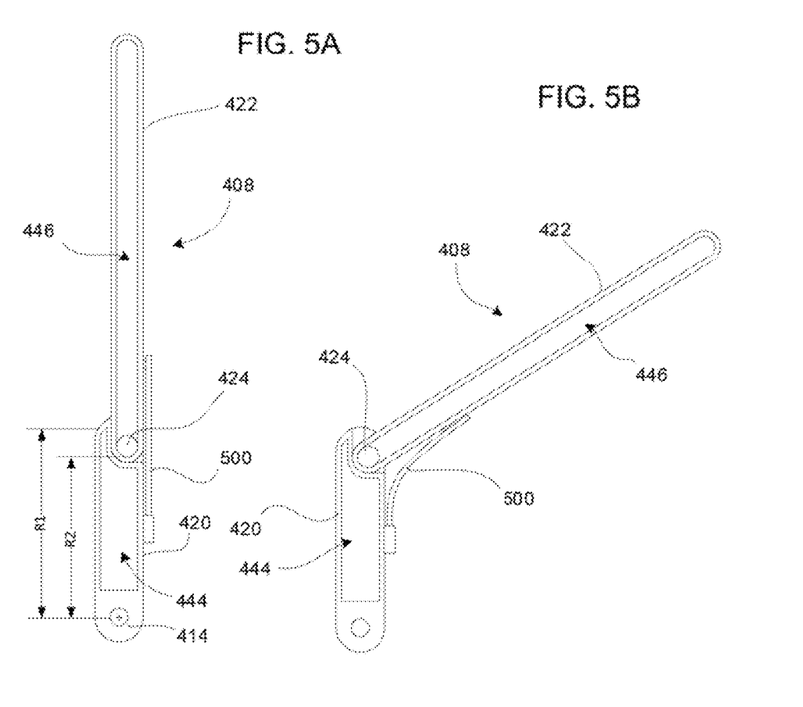
FIGS. 5A and 5B are plan views, as viewed from a downstream direction, of the suction wand component of the embodiment of FIG. 4.

FIGS. 4, 5A and 5B show another exemplary embodiment of an air screen cleaning assembly 400. In this example, the assembly 400 includes a frame 402, a screen 404, a motor 406, and a suction wand 408. FIG. 4 shows the assembly 400 in cross-section as seen in the plane of the screen 404, with the left half of the assembly 400 omitted. FIGS. 5A and 5B show the suction wand 408 in isolation, as viewed from the downstream direction.

The suction wand 408 again comprises a first wand element 420 and a second wand element 422. The first wand element 420 is operatively connected to the motor 406, such that the motor 406 can drive the first wand element entirely around a rotation axis 414. The second wand element 422 is connected to the first wand element by a pivot 424, which has a pivot axis 426 that is parallel to the rotation axis 414. The pivot 424 in this case comprises a hollow pin joint. The hollow pin joint may be formed using any suitable arrangement of parts. For example, the second wand element 422 may comprise a cylindrical projection that fits into a corresponding cylindrical bore in the first wand element 420, with a bearing 428 or bushing provided to facilitate smooth pivoting between the parts, such as shown in FIG. 4. Other alternatives and variations will be apparent to persons of ordinary skill in the art in view of the present disclosure.

The suction wand 408 is on the upstream side of the screen 404, and the motor 406 is on the downstream side of the screen 404. A driveshaft 430 is secured to the first wand element 420, and extends through the screen 404 to connect the first wand element 420 to the motor 406, or to a transmission 432 (e.g., pulley arrangement, gears, etc.) that is driven by the motor 406. The screen 404 may have a simple hole through it to accommodate the driveshaft 430, or it may include a reinforced hole, or a structural member such as a bearing plate 434 that supports the driveshaft 430.

As before, the suction wand 408 extends to a distal end 416 that is movable radially towards and away from the rotation axis 414. The distal end 416 may include one or more bearing surfaces that contacts the portion of the frame 402 that forms the non-circular outer perimeter 410 of the airflow passage. For example, one or more roller bearings 436 may be attached to the distal end 416 of the suction wand 408 to project slightly past the distal end 416 to contact the outer perimeter 410. In the shown example, one roller bearing 436 is located on the outer surface the second wand element 422, and another roller bearing is located inside a suction path formed in the second wand element 422, but a single bearing may be used in either location, or at other locations.

The first wand element 420 forms one or more first inlets 438 facing in the downstream direction, and the second wand element 422 forms one or more second inlets 440 facing in the downstream direction. As with other embodiments, each inlet 438, 440 may include one or more bristles, brushes or flaps 438', 440' that extend from the rigid body of the suction wand 408 to contact the screen 404. The second inlet 440 also may comprise a portion 440" (which also may have brushes or the like) that faces the frame 402 to help clean the outer perimeter 410.

In this example, the first and second inlets 438, 440 do not form a single continuous inlet extending along the length of the suction wand 408. This arrangement of separated inlets creates the potential for a portion of the screen 442 to receive relatively little cleaning where the inlets have a gap between them. However, this possible limitation can be overcome by forming one or the other of the inlets to overlap the other in the radial direction. For example, as shown in FIGS. 5A and 5B, the first wand inlet opening 438 extends to a first radial distance R1 from the rotation axis 414, and the second inlet opening 440 extends from a second radial distance R2 from the rotation axis 414 to the distal end 416. The second radial distance R2 is less than the first radial distance R1, and so the suction paths of the two inlets 438, 440 overlap throughout the movement range of the two suction wand elements 420, 422. Thus, the suction wand 408 can clean a continuous path to the distal end 416.

The suction wand 408 has an internal suction flow path that extends from the distal end 416 to the manifold 418. The first wand element 420 forms a first portion 444 of the suction flow path, which extends from the manifold 418 to the pivot 424 and is open on the downstream side to form the first inlet 438. The second wand element 422 forms a second portion 446 of the suction flow path that extends from the pivot 424 to the distal end 416. The first portion 444 and second portion 446 are fluidly connected by the hollow pin joint connecting the first wand element 420 to the second wand element 422. Alternatively, the hollow pin joint may be replaced by a solid pin joint and a flexible hose or other fluid passage can be provided to provide communication between the first portion 444 and the second portion 446 of the suction flow path. Other alternatives and variations will be apparent to persons of ordinary skill in the art in view of the present disclosure.

FIGS. 5A and 5B also show an alternative embodiment of a spring 500 that is operatively connected to the first wand element 420 and second wand element 422 and configured to bias the suction wand 408 into the first (extended) position. In this example, the spring comprises a leaf spring 500 that is rigidly fixed to the first wand element 420, and extends to contact the second wand element 422. As the motor 406 rotates the first wand element 420 about the rotation axis 414, the distal end 416 contacts the frame 402. When the distal end 416 is located in the corners (similar to FIG. 1A), the suction wand 408 is in the first position, and the second wand element 422 extends relatively straight from the first wand element, such as shown in FIG. 5A. As the motor continues to rotate the first wand element 420, contact between the distal end 416 (or an intermediate bearing 436) and the frame 402 causes the second wand element 422 to pivot relative to the first wand element 420 about the pivot axis 426 to assume a trailing position. Such movement causes the spring 500 to flex, thereby generating a restoring force to move the second wand element back to the extended position when it is able to do so.

FIG. 4 also illustrates an embodiment of an airflow blocking wand 448. The airflow blocking wand 448 comprises a plate or similar structure that generally matches the shape of the suction wand 408 and is positioned on the downstream side of the screen 404 to help concentrate airflow through the screen 404 as the suction wand 408 is rotated about the rotation axis 614. For example, the airflow blocking wand 448 may comprise a simple unperforated plate that faces the suction wand inlets to cause airflow to move laterally across the screen and into the inlets, or it may comprise one or more airflow holes or slots that allow air to flow in reverse through the screen 404.

The airflow blocking wand 448 is operatively connected to the motor 406, such as by being secured to the driveshaft 430 to rotate in unison with the suction wand 408. The airflow blocking wand also may be configured with a distal end 450 that is movable radially relative to the rotation axis 414 to follow the non-circular outer perimeter 410 of the airflow opening. For example, in this case, the airflow blocking wand 448 may have a first blocking wand element 452 that extends from the rotation axis 414, a second blocking wand element 454 that extends from the first blocking wand element 452 to the distal end 450, and a pivot 456 that connects the first blocking wand element 452 to the second wand blocking element 454. The pivot 456 is located at approximately the same location as the pivot 424 of the suction wand 408, so that the two elements of the airflow blocking wand 448 move in unison and stay oriented adjacent the respective elements of the suction wand 408. The airflow blocking wand 448 also may include its own bearing 458 to abut the frame 402, and a spring to bias the airflow blocking wand 448 to the first position.

In this and other embodiments, an airflow blocking wand (if used) may be constructed to mirror and operate the same as the associated suction wand.

Figure 6A:
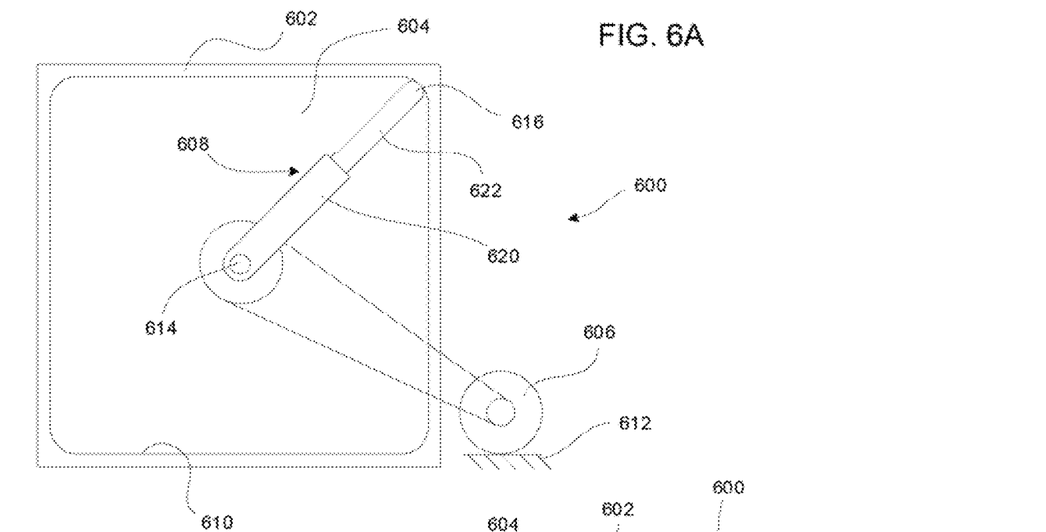
FIGS. 6A and 6B are plan views, as viewed from an upstream direction, of another exemplary embodiment of an air screen cleaning assembly shown in two different operative positions.
Figure 6B:
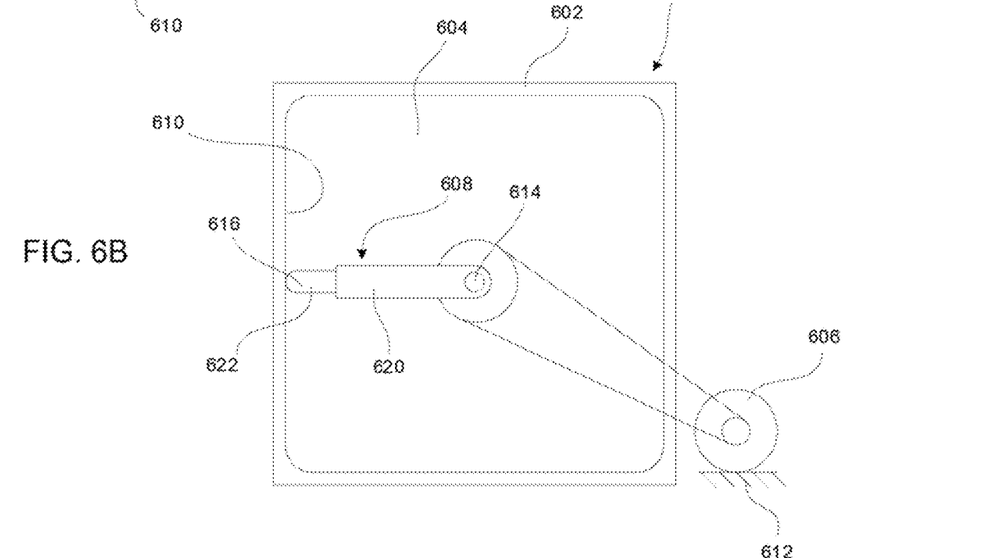
Figure 7:
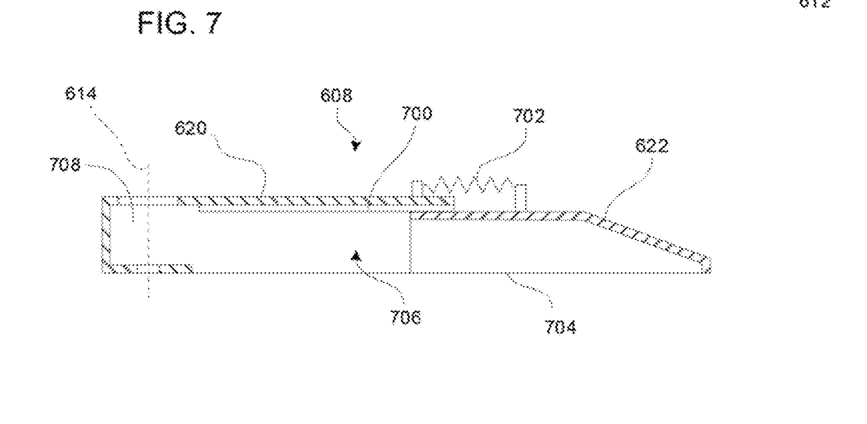
FIG. 7 is a cutaway side view of the suction wand component of the embodiment of FIGS. 6A and 6B.

Referring now to FIGS. 6A, 6B and 7, another exemplary embodiment of an air screen cleaning assembly 600 comprises a frame 602, a screen 604, a motor 606, and a suction wand 608. In this case, the frame 602 again has an airflow passage with a non-circular outer perimeter 610, and the screen 604 covers the airflow passage. In this example, the motor 606 is offset from the rotation axis 614 of the suction wand 608, and may be secured to a vehicle frame 612 or the like, and configured to drive the suction wand 608 by a belt drive or other suitable power transmission devices.

The suction wand 608 comprises a distal end 616 that is movable in a radial direction with respect to a rotation axis 614 of the suction wand 608, to thereby follow the non-circular outer perimeter 610 as the suction wand 608 rotates about the rotation axis 614. In this case, the suction wand 608 has a first wand element 620 that extends from the rotation axis 614, and a second wand element 622 that is telescopically connected to the first wand element 620. The second wand element 622 extends from the first wand element 620 to the distal end 616 of the suction wand 608. The second wand element 622 is telescopically movable relative to the first wand element 620 to move between a first position in which the distal end 616 is relatively far from the rotation axis 614 (FIG. 6A), and a second position in which the distal end 616 is relatively close to the rotation axis 614 (FIG. 6B).

The telescopic connection can be provided by any suitable configuration of bearing surfaces. For example, a linear slide bearing 700 may be disposed between the first wand element 620 and the second wand element 622. One or more springs, such as a coil spring 702 is provided between the first wand element 620 and the second wand element 622 to bias the suction wand 608 to the first position. As with other embodiments, the spring 702 may operate in tension or compression, or may comprise other types of spring (e.g., a pneumatic air spring).

In the embodiment of FIG. 7, the first wand element 620 and the second wand element 622 comprises respective open channels that face the downstream direction, and the first wand element 620 and the second wand element 622 are nested to one another. Thus, the first wand element 620 and second wand elements 622 form two portions of a continuous suction inlet 704, and an internal suction flow path 706 extends from the distal end 616 to a manifold 708.

Figure 8A:
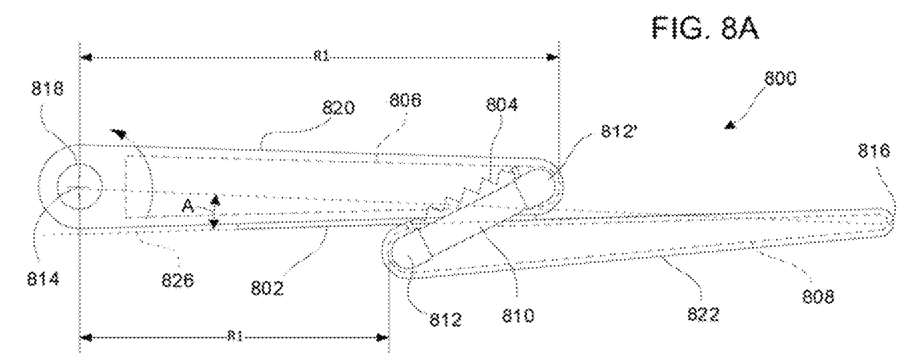
FIGS. 8A and 8B are plan views, as viewed from an upstream direction, of another exemplary embodiment of a suction wand component.
Figure 8B:
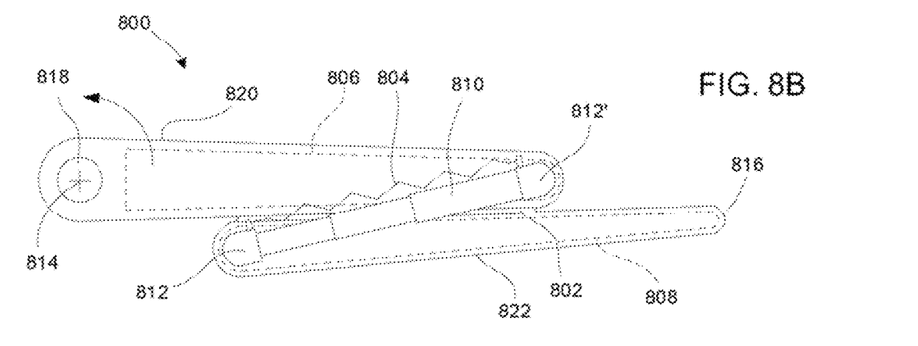

FIGS. 8A and 8B illustrate another embodiment of a telescopically-extending suction wand 800. In this case, the suction wand 800 comprises a first wand element 820 that extends from the rotation axis 814, and a second wand element 822 that is telescopically mounted to the first wand element 820. The second wand element 822 is slidingly attached to the first wand element 820 by a bearing 802, such as one or more linear slide bearings, to move between an extended first position (FIG. 8A) and a contracted second position (FIG. 8B). A spring 804 is provided to bias the suction wand 800 to the first position.

The first wand element 820 has one or more first inlets 806 facing in the downstream direction to clean debris from the screen (not shown), and the second wand element 822 has one or more second inlets 808 facing in the downstream direction to clean debris from the screen. The first and second wand inlets 806, 808 preferably are configured to overlap one another throughout the rotation of the suction wand 800. For example, the first inlet 806 may extend to a first radial distance R1 from the rotation axis 814, and the second inlet 808 may extend from a second radial distance R2 from the rotation axis 814, and when the suction wand is in the first position, the second radial distance R2 is less than the first radial distance R1.

The suction wand 800 has an internal suction flow path that extends from the distal end 816 to a manifold 818 located at the rotation axis 814. A portion of the suction flow path comprises a flexible passage 810 that fluidly connects the first wand element 820 to the second wand element 822. As shown in FIGS. 8A and 8B, the flexible passage 810 may comprise, for example, telescoping pipes that connect a first fitting 812 at the proximal end of the second wand element 822 to a second fitting 812' at the distal end of the first wand element 820. This arrangement is expected to provide relatively uniform suction along the entire length of the suction wand 800, as the airflow path extends along the full length of the second wand element 822 before entering the flexible passage 810, and extends along the full length of the first wand element 820 after exiting the flexible passage 810. However, other embodiments may use different configurations. Each fitting 812, 812' can swivel to accommodate relative movement of the wand elements. In other embodiments, the flexible passage 810 may comprise a flexible hose or other suitable devices.

The bearing 802 may have a sliding axis 826 that is offset from the rotation axis 814—that is, the sliding axis does not intersect the rotation axis 814. For example, the sliding axis also may be offset from the rotation axis 814 in a trailing configuration with respect to the rotation direction, which in FIGS. 8A and 8B, is counterclockwise (as shown by the arrow). In this configuration the sliding axis is inclined at an angle A towards the point of contact between the distal end 816 and the outer perimeter (not shown). Thus the loads causing the second wand element 822 to retract along the first wand element 820 are oriented more in line with the bearing 802, which can help alleviate torsion loads experienced by the bearing 802. While potentially being favorable, this configuration is not required in all embodiments.

Figure 9:
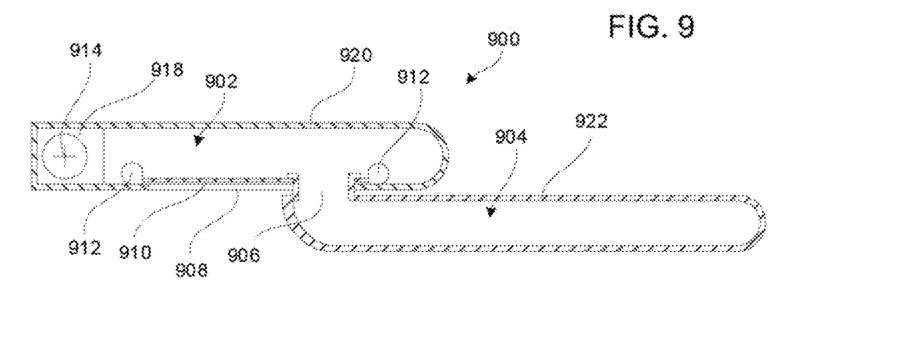
FIG. 9 is a cutaway plan view, as viewed from a downstream direction, of another exemplary embodiment of a suction wand component.

FIG. 9 shows yet another embodiment of a suction wand 900. In this case, the suction wand has a first wand element 920 that is mounted to rotate about a rotation axis 914, and a second wand element 922 that slides relative to the first wand element 920. The first wand element 920 comprises a first portion 902 of the suction path to the manifold 918, and the second wand element 922 comprises a second portion of the suction path. The second wand element 922 is slidingly connected to the first wand element 920 by one or more linear bearings or bearing surfaces.

In this example, the suction path between the first wand element 920 and the second wand element 922 is formed by a fitting 906 that is mounted to slide along an open slot 908 that extends along a side of the first wand element 920. A cover 910 is provided to cover the portions of the open slot 908 that are not currently occupied by the fitting 906. The cover 910 may comprise a rigid plate that is long enough to cover the unoccupied portions of the slot 908, or it may comprise a flexible membrane or belt that is retained in spools 912 at each end, with a track extending along the sides of the open slot 908 to hold the membrane or belt adjacent the slot 908. Of course, the construction also may be reversed, with the slot being provided on the second wand element 922 and the fitting being provided on the first wand element 920.

FIGS. 10A through 11B illustrate yet another exemplary embodiment. In this case, the air screen cleaning assembly 1000 includes a frame 1002 having an airflow opening with a non-circular outer perimeter 1010, and a screen 1004 mounted to the frame 1002 to cover the airflow opening. A suction wand 1008 is provided to rotate about a rotation axis 1014, which is located in a central region of the screen 1004. A motor (not shown) is operatively connected to the suction wand 1008 to rotate the suction wand 1008.

Figure 10A:
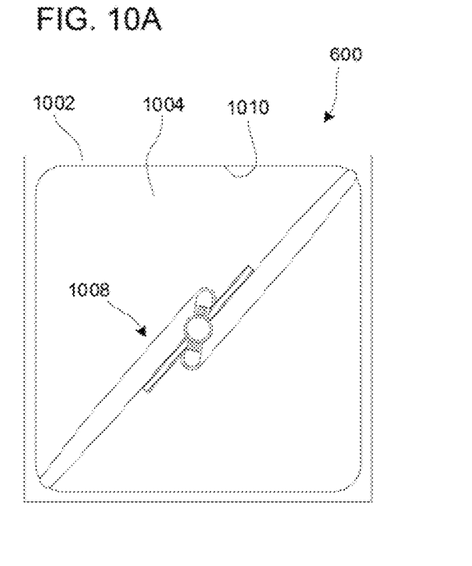
FIGS. 10A and 10B are plan views, as viewed from an upstream direction, of another exemplary embodiment of an air screen cleaning assembly shown in two different operative positions.
Figure 10B:
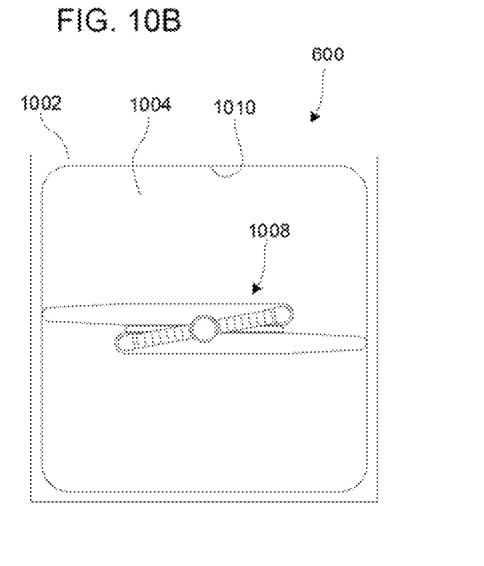
Figure 11A:
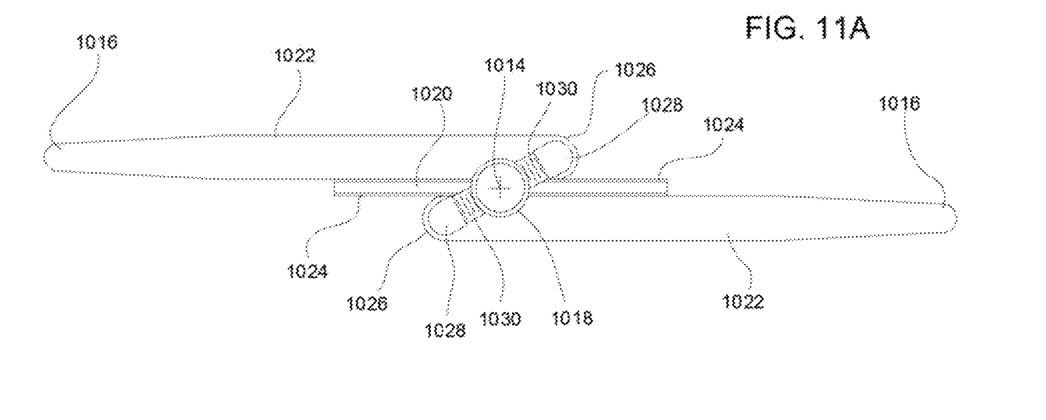
FIGS. 11A and 11B are plan views, as viewed from an upstream direction, of the suction wand component of the embodiment of FIGS. 10A and 10B, shown in two different operative positions.
Figure 11B:
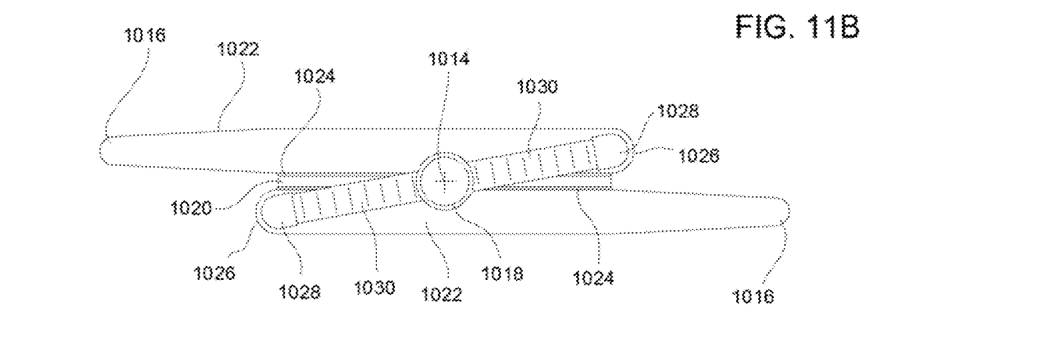
Figure 12:
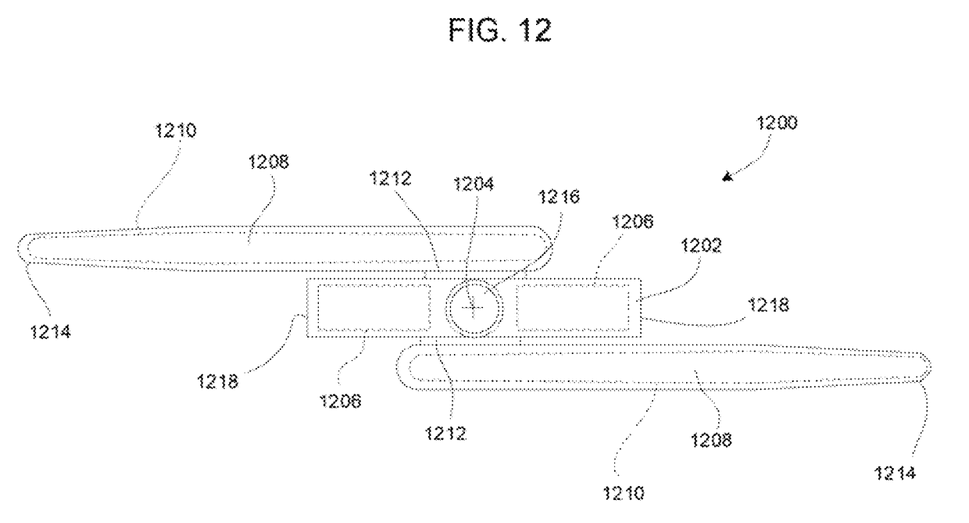
FIG. 12 is a plan view, a viewed from an upstream direction, of another exemplary embodiment of an air screen cleaning assembly.

The suction wand 1008 in this example is configured with a first wand element 1020 that is connected to rotate about the rotation axis 1014, and a pair of second wand elements 1022 that are mounted to the first wand element 1020. Each of the second wand elements 1022 is slidingly connected to an opposite side of the first wand element 1020 by a respective sliding bearing 1024. The bearings 1024 may hold the second wand element in a trailing configuration, such as discussed above, but this is not strictly required. A spring (not shown), such as the ones discussed previously herein, is provided to bias the second wand elements to the extended position. Thus, the suction wand 1008 can move between a first position as shown in FIG. 10A, in which the second wand elements 1022 are extended into the corners of the non-circular airflow opening, and a second position as shown in FIG. 10B in which the second wand elements 1022 are retracted to follow the outer perimeter 1010 as the suction wand 1008 rotates.

The suction wand 1008 has a suction path that has two branches. Each branch extends from a distal end 1016 of a respective second wand element 1022 to a proximal end 1026 of the respective second wand element 1022. Each second wand elements 1022 has one or more inlets facing the screen 1004 to allow air to enter the suction path. A fitting 1028 connects each proximal end 1026 to a common manifold 1018 located at the rotation axis 1014, by way of a respective flexible passage 1030. In this example, the flexible passages 1030 comprise extendible hoses, but they alternatively may comprise bendable hoses that do not change length, telescoping sliding tubes, and so on.

In this example, the suction path does not pass through the first wand element 1020. Thus, the first wand element 1020 acts as a support arm that does not have a function to clean debris from the screen by suction. However, the first wand element 1020 may include a brush, flaps, or other devices to sweep the screen 1004 as the suction wand 1008 rotates. In other examples, however, the first wand element 1020 may comprise portion of the suction flow path, such as described in relation to other embodiments herein. Also, in other embodiments, the second wand elements 1022 may be connected to the first wand element 1020 to pivot relative thereto. In this case, the first wand element 1020 may include a portion of the suction path. It will also be appreciated that the foregoing embodiments also may be modified to have multiple suction arm components, such as the embodiment of FIGS. 10A-11B, FIG. 12 illustrates another exemplary embodiment of a suction wand 1200. Suction wand 1200 is similar to the embodiment of FIGS. 10A through 11B, but the first wand element is formed as part of the suction path. Specifically, the suction wand 1200 has a first wand element 1202 that is rotatable about a rotation axis 1204, and has one or more suction openings 1206 extending through a side facing the screen (not shown). The suction wand 1200 also has two second wand elements 1208 telescopically mounted to opposite sides of the first wand element 1202. The second wand elements 1208 have their own respective suction openings 1210 facing the screen. The second wand elements 1208 are in fluid communication with the first wand element 1202 via respective sliding fittings 1212, such as described in relation to FIG. 9. The suction path thus extends from distal ends 1214 of each second wand element 1208, through the fittings 1212, into the first wand element 1202 and to an outlet manifold 1216 located centrally on the first wand element 1202. The suction path also extends from the distal ends 1218 of the first wand element 1202 to the outlet manifold 1206. It is also envisioned that first wand element 1202 may not have any suction openings 1206, in which case all of the debris recovery will be via the suction openings 1210 in the second wand elements 1208. Other alternatives and variations will be apparent to persons of ordinary skill in the art in view of the present disclosure.

Figure 13:
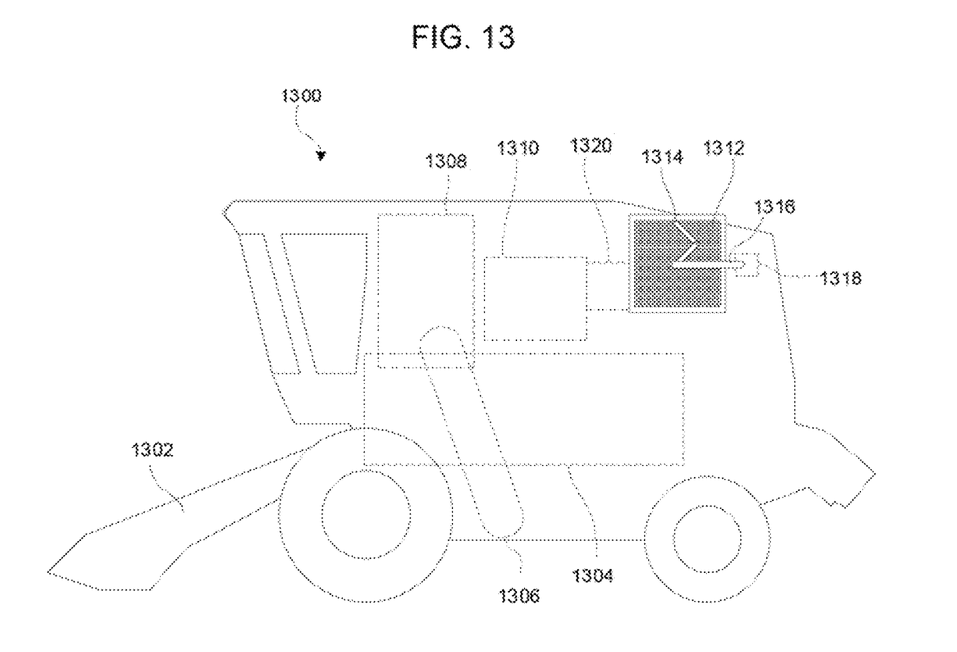
FIG. 13 illustrates an example of an agricultural combine having a rotating suction wand for a non-circular air screen.

FIG. 13 schematically illustrates an agricultural combine 1300. A typical combine comprises a wheel- or track-driven vehicle having a header 1302 to cut and draw in crops, an internal threshing and separating system 1304 to separate grain from other material, and a grain elevator 1306 to lift the separated grain to a grain hopper 1608. One or more engines 1310 are provided to power the operating systems of the combine 1300. For example a single gasoline or diesel engine may be provided to power various mechanical, electrical and hydraulic systems. Cooling and/or engine combustion intake airflow is provided to the engine 1310 via an airflow passage 1320 that is covered by a non-circular air screen 1312. A suction wand 1314 is provided to rotate on and clean the non-circular air screen 1312 by extending and contracting to the outer perimeter of the screen 1312, such as described herein. A suction pipe 1316 attached at one end to the suction wand 1314 and at the other end to a suction generator 1318, such as an impeller, fan, or other device known in the art. In use, the suction generator 1318 generates a suction that is applied to the suction wand 1314 to clean debris from the screen 1312 as the suction wand 1314 rotates.

The foregoing exemplary embodiments describe the use of a spring to bias the suction wand into a desired position as the suction wand rotates relative to the screen. The spring may operate to push the second wand element out towards the outer perimeter, or to pull the second wand element in towards the rotation axis, depending on how the distal end of the suction wand it retained in place against the outer perimeter. It will also be understood that in all cases the spring may be replaced by or supplemented with a cam and follower system. It is also envisioned that the spring may be replaced by or supplemented with an active control system. For example, a hydraulic or pneumatic actuator may be provided to extend and contract the suction wand as needed.

Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An agricultural equipment air screen cleaning assembly comprising:
   a frame having an airflow opening having a non-circular outer perimeter;
   a screen mounted to the frame within the airflow opening and extending to the non-circular outer perimeter;
   a motor; and
   a suction wand operatively connected to the motor and located on an upstream side of the screen, the suction wand being rotatably connected about a rotation axis at a central region of the screen, the suction wand comprising:
      at least one distal end that is movable in a radial direction with respect to the rotation axis to follow the non-circular outer perimeter as the suction wand rotates about the rotation axis,
      one or more inlet openings facing the screen, and
      an internal suction flow path in fluid connection with the one or more inlet openings, the suction flow path extending from a manifold to the at least one distal end of the suction wand.

2. The agricultural equipment air screen cleaning assembly of claim 1, wherein the suction wand comprises:
   a first wand element extending from the rotation axis;
   a second wand element pivotally connected to the first wand element about a pivot axis that is parallel to the rotation axis, the second wand element extending from the first wand element to a first distal end of the suction wand and being movable between a first position in which the first distal end of the suction wand is relatively far from the rotation axis, and a second position in which the first distal end of the suction wand is relatively close to the rotation axis.

3. The agricultural equipment air screen cleaning assembly of claim 2, further comprising a spring connecting the first wand element to the second wand element, the spring being configured to bias the second wand element to the first position.

4. The agricultural equipment air screen cleaning assembly of claim 2, further comprising one or more bearings at the first distal end of the suction wand and configured to contact the frame throughout a full rotation path of the suction wand.

5. The agricultural equipment air screen cleaning assembly of claim 2, wherein the first wand element comprises a first inlet opening of the one or more inlet openings facing the screen and the second wand element comprises a second inlet opening facing the screen, and the first inlet opening extends to a first radial distance from the rotation axis, and the second inlet opening extends from a second radial distance from the rotation axis to the first distal end of the suction wand, the second radial distance being less than or equal to the first radial distance.

6. The agricultural equipment air screen cleaning assembly of claim 2, wherein the first wand element and the second wand element collectively form a single inlet opening facing the screen, the single inlet opening comprising the one or more inlet openings.

7. The agricultural equipment air screen cleaning assembly of claim 1, wherein the suction wand comprises:
   a first wand element extending from the rotation axis;
   a second wand element telescopically connected to the first wand element, the second wand element extending from the first wand element to a first distal end of the suction wand and being movable between a first position in which the first distal end of the suction wand is relatively far from the rotation axis, and a second position in which the first distal end of the suction wand is relatively close to the rotation axis.

8. The agricultural equipment air screen cleaning assembly of claim 7, further comprising a spring connecting the first wand element to the second wand element, the spring being configured to bias the second wand element to the first position.

9. The agricultural equipment air screen cleaning assembly of claim 7, wherein:
   the first wand element comprises a first inlet opening facing the screen and extending to a first radial distance from the rotation axis; and
   the second wand element comprises a second inlet opening facing the screen and extending from a second radial distance from the rotation axis to the first distal end of the suction wand;
   wherein, when the second wand element is in the first position, the second radial distance is less than or equal to the first radial distance.

10. The agricultural equipment air screen cleaning assembly of claim 9, wherein the suction flow path comprises a flexible passage fluidly connected between the first wand element and the second wand element.

11. The agricultural equipment air screen cleaning assembly of claim 7, wherein the first wand element comprises a support arm, and the one or more inlet openings are in the second wand element.

12. The agricultural equipment air screen cleaning assembly of claim 7, wherein the first wand element and the second wand element are telescopically connected by a linear bearing having a sliding axis that is offset from the rotation axis.

13. The agricultural equipment air screen cleaning assembly of claim 12, wherein the sliding axis is in a trailing position relative to a rotation direction of the suction arm.

14. The agricultural equipment air screen cleaning assembly of claim 7, wherein the suction wand further comprises:
   a third wand element telescopically connected to the first wand element, the third wand element extending from the first wand element to a second distal end of the suction wand and being movable between a respective first position in which the second distal end of the suction wand is relatively far from the rotation axis, and a respective second position in which the second distal end of the suction wand is relatively close to the rotation axis.

15. The agricultural equipment air screen cleaning assembly of claim 14, wherein:
   the first wand element comprises a support arm;
   at least a first inlet opening of the one or more inlet openings is located in the second wand;
   at least a second inlet opening of the one or more inlet openings is located in the third wand;

the suction flow path comprises a first flexible passage fluidly connected between the second wand and the manifold; and the suction flow path comprises a second flexible passage fluidly connected between the third wand and the manifold.

16. The agricultural equipment air screen cleaning assembly of claim 1, further comprising an airflow blocking wand operatively connected to the motor and located on a downstream side of the screen at a location opposite the suction wand, the airflow blocking wand being rotatably connected about the rotation axis and comprising a distal end that is movable in a radial direction with respect to the rotation axis to follow the non-circular outer perimeter as the airflow blocking wand rotates about the rotation axis.

17. The agricultural equipment air screen cleaning assembly of claim 1, wherein the airflow opening has a square outer perimeter.

18. An agricultural combine comprising:
an engine;
a frame having an airflow opening having a non-circular outer perimeter;
a screen mounted to the frame within the airflow opening and extending to the non-circular outer perimeter;
an airflow passage extending from the screen to the engine; and
an air screen cleaning assembly comprising:
a motor; and
a suction wand operatively connected to the motor and located on an upstream side of the screen, the suction wand being rotatably connected about a rotation axis at a central region of the screen, the suction wand comprising:
at least one distal end that is movable in a radial direction with respect to the rotation axis to follow the non-circular outer perimeter as the suction wand rotates about the rotation axis,
one or more inlet openings facing the screen, and
an internal suction flow path in fluid connection with the one or more inlet openings, the suction flow path extending from a manifold to the at least one distal end of the suction wand.

19. The agricultural combine of claim 18, wherein the suction wand comprises:
a first wand element extending from the rotation axis;
a second wand element pivotally connected to the first wand element about a pivot axis that is parallel to the rotation axis, the second wand element extending from the first wand element to a first distal end of the suction wand and being movable between a first position in which the first distal end of the suction wand is relatively far from the rotation axis, and a second position in which the first distal end of the suction wand is relatively close to the rotation axis.

20. The agricultural combine of claim 18, wherein the suction wand comprises:
a first wand element extending from the rotation axis;
a second wand element telescopically connected to the first wand element, the second wand element extending from the first wand element to a first distal end of the suction wand and being movable between a first position in which the first distal end of the suction wand is relatively far from the rotation axis, and a second position in which the first distal end of the suction wand is relatively close to the rotation axis.

* * * * *